March 13, 1934.　　H. L. HIRSCHLER　　1,950,891
THERMOSTAT
Filed Dec. 19, 1931　　3 Sheets-Sheet 1
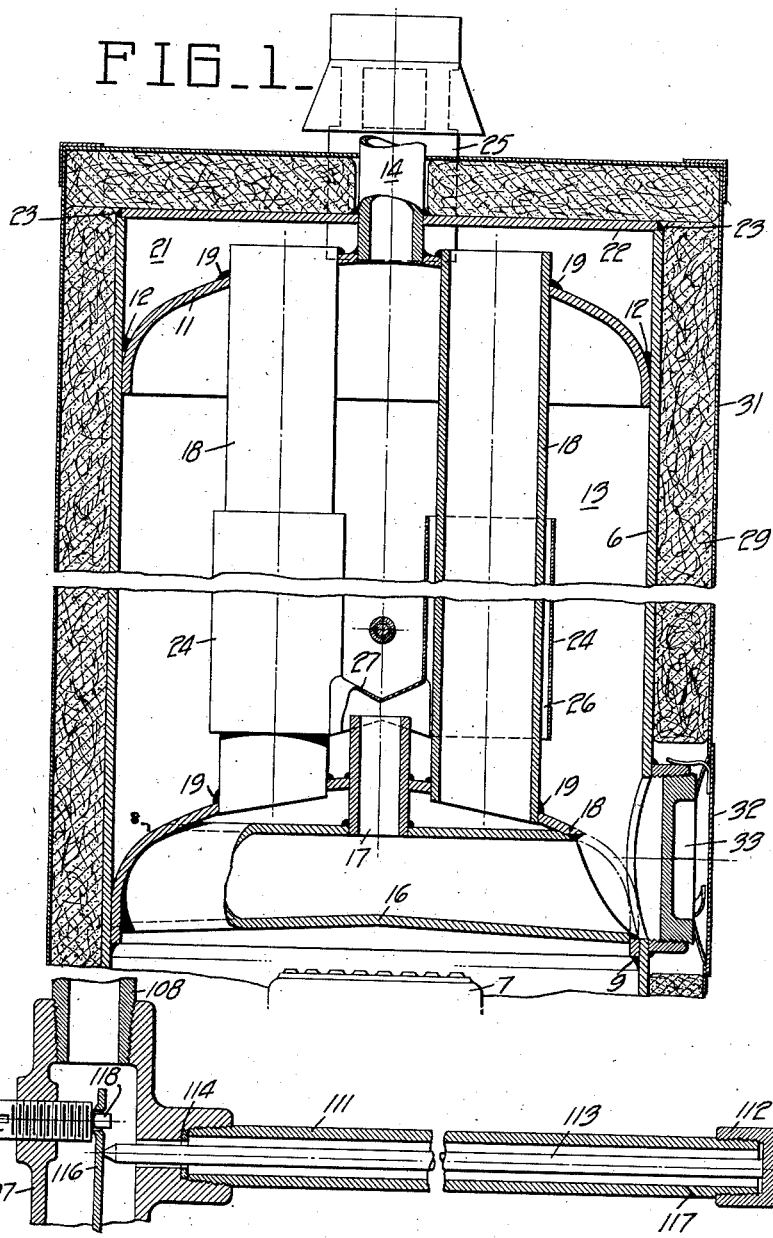
FIG_1_
FIG_3_
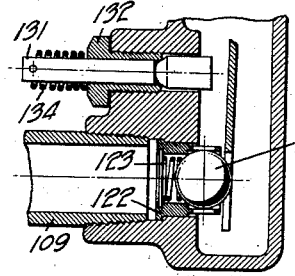
FIG_4_
INVENTOR.
HORACE L HIRSCHLER
BY
ATTORNEYS.

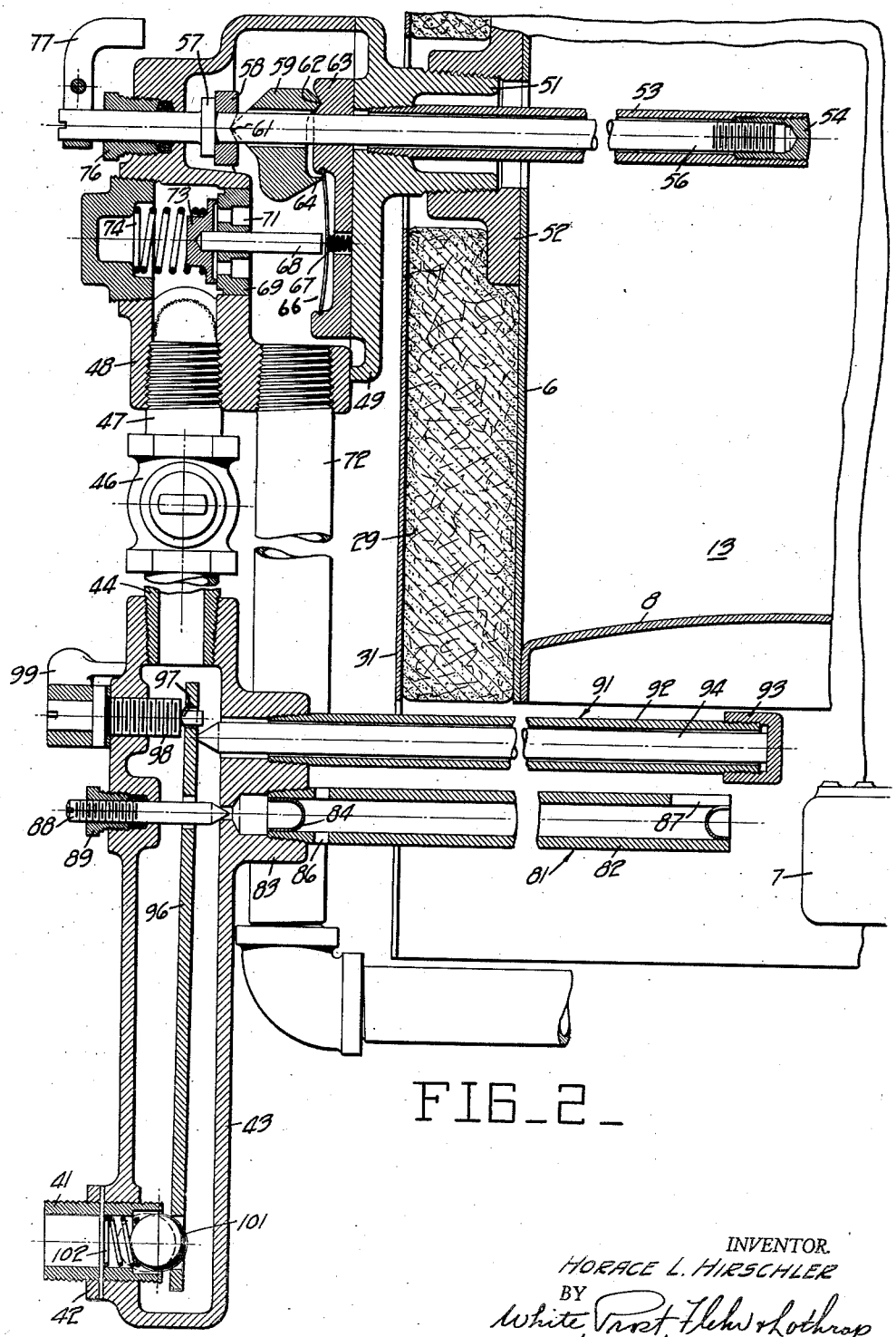
FIG_2_

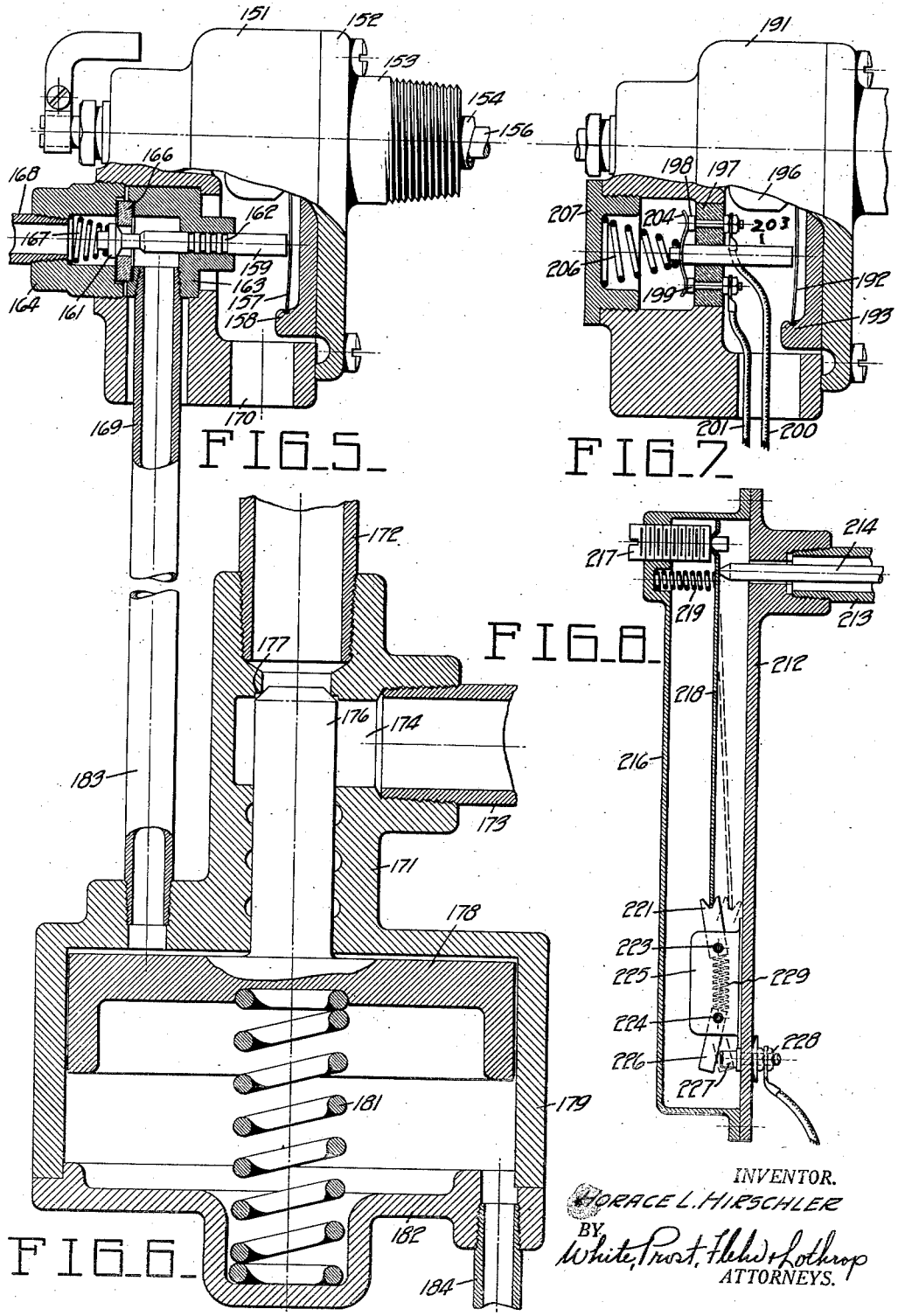

Patented Mar. 13, 1934

1,950,891

UNITED STATES PATENT OFFICE 1,950,891

THERMOSTAT

Horace L. Hirschler, San Francisco, Calif.

Application December 19, 1931, Serial No. 582,042

8 Claims. (Cl. 236—48)

My invention relates to thermostats for controlling the operation of mechanism such as electrical circuits, valves, and burners, and is particularly concerned with the control of burners utilized in conjunction with hot water heaters.

An object of my invention is to provide a thermostat which is extremely rugged and is not susceptible to damage by reason of extremes in temperature.

Another object of my invention is to provide a thermostat which is simple in construction and has a minimum number of working parts.

A further object of my invention is to provide a water heater with which the thermostat of my invention is particularly applicable.

An additional object of my invention is to provide a thermostat arrangement for a heater such as a water heater, which is reliable and safe in its operation.

The foregoing and other objects are attained in the embodiment of the invention shown in the drawings, in which Figure 1 is a cross section on a vertical central plane, showing a water heater constructed in accordance with my invention, a portion being broken away to decrease the size of the figure.

Figure 2 is a cross section on a vertical plane of a thermostat assembly constructed in accordance with my invention.

Figure 3 is a cross section on a vertical plane of a portion of a modified form of thermostat.

Figure 4 is a cross section on a vertical plane of an additional, modified form of thermostat.

Figure 5 is a view similar to Figure 2 but showing a modified construction.

Figure 6 is a cross section showing a valve operating device suitable for use with the mechanism shown in Figure 5.

Figure 7 shows a modified form of thermostat for use in an electrical circuit, portions being disclosed in cross section.

Figure 8 shows in cross section a further modified form of thermostat for use in an electrical circuit.

In its preferred form the thermostat of my invention comprises a thermally responsive element for actuating by means of a snap motion a valve for controlling fuel to an actuated device which is usually ultimately effective upon the thermostat, and the thermostat being so constructed as not to be effected by extremes of temperature outside of its normal operating range.

Since the thermostat of my invention is particularly adapted for use in connection with water heaters, I have developed a water heater, disclosed in Figure 1, which serves as a typical environment for purposes of description herein.

In the water heater shown in Figure 1, there is provided an exterior shell 6 usually of cylindrical form and preferably fabricated of sheet metal. The shell 6 at its lower end provides a housing for a burner 7 designed to utilize gaseous fuel. Above the housing for the burner there is provided a lower head 8 of generally dome form, which is inserted into the shell 6 and is secured in place by any suitable means, such as welding 9. Adjacent the other end of the shell 6 there is provided a similar head 11, likewise welded in place, as at 12, to form between the heads 8 and 11 and the walls of the shell 6 a chamber 13 to receive the fluid to be heated, usually water. The chamber 13 is connected to a supply of water by a pipe (not shown), while an outlet from the chamber 13 for heated water is provided by a nipple 14.

In order that heat from the burner 7 may be effective upon water within the chamber 13, in an expeditious manner, I provide a tube 16 spanning the interior of the dome or head 8, and open at each end to the chamber 13. This tube is most directly exposed to flames from the burner 7, and the contents thereof are quickly heated. In order to utilize convection currents incident upon the heating of fluid in the tube 16, I provide an outlet 17 therefrom extending to the central portion of the chamber 13. By virtue of such arrangement, there is a convection circulation into the ends of the tube 16 from the chamber 13 and out through the outlet 17 to the center of the chamber 13.

In order that a large amount of heat from the products of combustion from the burner 7 may be utilized, I preferably traverse the interior of the chamber 13 with one or more flues 18 extending between the heads 8 and 11 and secured thereto as by welding 19. The flues are preferably cylindrical in form, and are preferably fabricated of sheet metal. The lower ends of the flues terminate just above the tube 16, while the upper ends of the flues terminate above the head 11 in a compartment 21 bounded not only by the shell 6 and the upper head 11, but also by a closure plate 22 forming the upper end of the shell 6 and secured thereto by welding 23. The compartment 21 is vented by means of a pipe 25 extending to a stack or other suitable outlet.

In order to increase the heating effect on the water and in order to extract as much as possible of the heat from the products of combustion passing through the flues 18, I preferably surround each of the flues with a muff 24, customarily of sheet metal, which is spaced slightly from the wall of the flue to leave a relatively small passageway 26 between the flue and the muff. Each of the muffs 24 is connected to a central manifold 27 overlying the discharge end of the outlet 17, so that water which initially is heated in the tube 16 and discharges through the conduit 17, flows through the manifold 27 to the various passages 26 formed by the individual muffs 24, so that extra rapid heating is obtained and so that by convection the heated water is discharged from the upper end of the muffs into the upper portion of the chamber 13.

Furthermore, I obtain an additional extraction of heat from the gases discharging from the flues 18 by providing the compartment 21 and leaving the head 11 uninsulated so that these gases can eddy around the upper head 11 and transfer their heat content to the water within the compartment 13 before they discharge through the outlet 23. In order to reduce heat losses by radiation as much as possible, I surround the shell with an insulating blanket 29, which is retained in place by an outer shell 31. Access is had to the interior of the chamber 13 and to the interior of the tube 16, primarily for purposes of cleaning, by a removable cover plate 32 in the shell 31, which uncovers a removable plug 33 in juxtaposition with the tube 16.

So that the temperature of the water within the chamber 13 can be maintained within the desired range, and in order that the operation of the burner 7 can be suitably controlled, I preferably provide a thermostat arrangement as disclosed in Figure 2. In the present instance, the burner 7 is designed to operate on a gaseous fuel, which is conducted to the mechanism through a pipe (not shown) connected to a nipple 41 screwed into a boss 42 formed at the lower end of a housing 43. The gas flows into the housing 43 and discharges therefrom into a pipe connection 44, flow through which is controlled by a valve 46, and into another pipe connection 47 fastened into a casing 48. The casing 48 is provided with a plate 49 having a threaded boss 51 thereon which is screwed into a suitable fitting 52 forming part of the shell 6.

Supported by the plate 49 is a tube 53 extending into the chamber 13 of the heater and closed at its outer end by means of a plug 54 into which a rod 56 is screwed. Preferably the materials of the rod 56 and of the tube 53 are sufficiently different in coefficients of expansion under temperature increase, that the rod 56 upon an increase in temperature is moved toward the right in Figure 2, and upon a decrease in temperature, is moved toward the left in Figure 2, all with respect to the base plate 49.

In order that the thermostat, including the tube 53 and the rod 56, can be effective to control the flow of gas through the casing 48, the rod 56 is provided with an enlarged collar 57 which bears against a washer 58 serving as a support for a lever 59 which is pierced to pass the rod 56 and which is provided not only with a knife edge 61, to seat within the washer 58, but is likewise provided with a knife edge 62 designed to seat in a depression in a body 63 retained within the casing 48 and resting upon the base plate 49. The lever 59 is in addition provided with a knife edge 64 bearing against a metallic strip 66 adjacent either the rear or far end of the strip which is secured in the body 63. The strip 66 is of such a length that as it is held between longitudinally confining notches in the body 63 it tends to assume either the extreme position shown in Figure 2 or another extreme position having mirror symmetry with the position shown, and the strip moves abruptly or snaps from one of the positions to the other. To assist the movement of the strip, and to provide a bias opposed to the movement of the thermostat rod 56, a spring 67 is seated in a suitable bore in the body 63, and bears against the strip 66.

In the path of the strip as the strip assumes its other flexed position, but normally spaced therefrom to afford a lost motion connection is a stem 68 extending through a plug 69 screwed into the casing 48 and being provided with a plurality of apertures 71 for the passage of gas from the pipe 47 to a pipe 72 leading to the burner 7. The stem 68 is united with a valve 73 which governs the flow through the apertures 71. The valve is normally held seated by a coil spring 74, and prevents the passage of gas from the pipe 47 to the pipe 72. When the temperature of the contents of the chamber 13 is relatively low, however, the tube 53 is contracted and the collar 58 is toward the left in Figure 2, so that under the bias of the spring 67 the strip 66 flexes and abuts the stem 68 to open the gas valve 73, whereupon the burner 7 operates. When the temperature of the contents of the chamber 13 rises to the desired value, however, the tube 53 expands and draws with it the rod 56, so that the collar 58 presses against the knife edge 61 and fulcrums the lever 59 about the point 62 so that the strip 56 is flexed in the opposite direction, and in leaving contact with the stem 68 it enables the spring 74 to close the valve 73, thereby interrupting operation of the burner 7.

In order that the temperature at which the thermostat is effective may be regulated or adjusted, the rod 56 is extended through a stuffing box 76 to the exterior of the casing 48, and is provided with an actuating handle 77. By rotating the handle 77, the rod 56 is likewise rotated and by virtue of its threaded engagement with the plug 54 varies the spacing of the collar 57 with respect to the fulcrum point 62 of the lever 59, so that the snap action of the strip 56 occurs at a different temperature.

With the described construction very little care in manufacture is required. Since the rod 56 is supported adjacent opposite ends the lever 59 is accurately located with respect thereto by the edges 61 and 62. In addition, excessively low temperatures often encountered in storage or in shipment cannot injuriously affect the mechanism as the tube 53 simply contracts and at worst moves the collar 58 away from the lever 59. Furthermore, by having the strip 66 and its associated parts mounted on the body 63, they can be tested and calibrated, if desired, before final assembly.

The burner 7 is preferably ignited by means of a pilot burner 81 which preferably comprises a tube 82 screwed into the boss 83 forming part of the housing 43 and carrying a perforated thimble 84 through which gas from the interior of the chamber 43 can pass to be mixed with air flowing in through apertures 86. The mixture formed in the interior of the tube 82 emerges from a slot 87 cut in the end of the tube, and is ignited. The amount of gas flowing to the thimble 84 is conveniently regulated by a needle valve 88 which passes through a suitable stuffing box 89 mounted in the housing 43.

If it should occur that the pilot flame is accidentally extinguished, I provide means for shutting down the operation of the entire mechanism. To this end a thermostat, generally designated 91, is formed of an outer tube 92 screwed into the casing 43 and extending in thermal relationship with the burner 7. The tube is provided with a cap 93 over its free end, which cap abuts against a rod 94 extending through the length of the tube and passing to the interior of the housing 43. The material of the rod 94 and of the tube 92 is such that when the pilot flame is extinguished the resulting drop in temperature causes a relative movement between the rod and the tube with the rod moving toward the left in Figure 2. This end of the rod is pointed to abut a lever 96 preferably of slightly yielding material. The lever at one end is fulcrumed, as at 97, on a projection extending from a stud 98 seated in the casing 43, and provided on its exterior with a handle 99 for manual rotation thereof. The lever 96 at its opposite extreme partially encompasses a ball 101 adapted to move axially in the end of the nipple 41 against the urgency of a coil spring 102. When the rod 94 is translated toward the left in Figure 2, the lever 96 is rotated about the end of the stud 97 and against the urgency of the spring 102 forces the ball 101 to seat within the nipple 41 and stop the flow of gas.

In order that the mechanism can be reset for relighting, the manually controlled stud 98 is rotated, which moves the fulcrum 97, permitting the ball valve 101 to open slightly, and allowing sufficient gas to flow so that the pilot flame issuing from the slot 87 can again be ignited.

As shown in Figure 3, there is provided a modified form of a thermostat particularly designed for use with a pilot flame. In this instance, the casing 107 through which the gas flows is provided with an outlet connection 108 and with an inlet connection 109. The casing likewise supports a thermostat tube 111 which at its outer end is provided with a cap 112 abutting one end of an internally disposed rod 113. The rod being of different material than the tube, it moves relative thereto under variations in temperature.

In this instance, the rod 113 passes through a suitably fluted or perforated guiding disc 114, and impinges upon a lever 116 disposed within the hollow interior of the casing 107. By virtue of this arrangement, the gas for the pilot burner flows around the rod 113 through the tube 111 and emerges through a suitable aperture 117 provided therefor, and thus obviates the necessity of using a separate gas conducting tube. The lever 116 is carried by an extension 118 at the extremity of a stud 119 screwed into the casing 107, while the opposite end of the lever, which preferably is of slightly resilient material, abuts against a ball 121 adapted to operate in a body 122 held in place in the casing 107 by the inlet connection 109. The valve ball 121 is normally urged off of its seat by a spring 123.

In the operation of this mechanism, when the thermostat responds to increasing temperature, the tube 111 moves the cap 112 and the rod 113 toward the right in the figure under the urgency of the spring abutting the ball 121, while upon decrease in temperature below the desired minimum, the contraction of the outer tube 111 causes the rod 113 to move to the left, as shown in Figure 3, and causes the lever 116 to rock on its fulcrum about the extension 118 and depress the ball valve 121 against the urgency of the spring 123 onto its seat in the body 122.

In order that this thermostat may be relighted in the event that the pilot flame is extinguished, I preferably provide a spring pressed plunger 131 which passes through a suitable gland 132 mounted in the casing 107, and which normally is held on a gas tight seat 133 by a spring 134. When the pilot flame is again to be ignited, manual pressure on the plunger 131 against the urgency of the spring 134 causes the plunger to abut the lever 116 and to flex the lever slightly so that the ball valve 121 can be driven off of its seat by the spring 123, thus permitting sufficient gas to flow so that the pilot flame can again be ignited.

Under certain conditions of operation and in certain environments, it often occurs that the thermostat must be made relatively small and is therefore too weak to operate directly a valve for controlling flow of a fluid under relatively high pressure. So that a thermostat can be provided for this purpose and still remain relatively small and quite accurate, I arrange a mechanism as disclosed particularly in Figure 5. In this figure, there is shown an actuating mechanism for use in conjunction with and controlled by the thermostat itself.

This thermostat comprises a casing 151 having a base 152 which is provided with a mounting boss 153 through which project a thermostat tube 154 and a thermostat rod 156 generally arranged and constructed as shown in Figure 2. In this instance, a strip 157 is mounted between suitable supports, such as 158 in the casing and is adapted to act on the stem 159 of a pilot valve 161, suitably mounted in the casing. The stem 159 is preferably provided with a plurality of circumferential grooves 162 for sealing purposes and is mounted to move in a block 163 inserted into the casing 151. Likewise engaged with the casing is a plug 164 so arranged with respect to the block 153 that a valve seat 166 is held between them. The valve 161 is normally held on the seat 166 by a spring 167 interposed between the valve 161 and an inlet conduit 168 for fluid under pressure. An outlet for such fluid under pressure is provided by a conduit 169 introduced into the casing 151 and in engagement with the block 153. Any leakage past the stem 159 discharges from the casing through an opening 170.

Under the urgency of the thermostat tube 154 and the rod 156 and more immediately under the bias of the abruptly moving strip 157, and of the spring 167, the stem 159 of the valve 161 is translated so that fluid under pressure is controlled in its flow from the conduit 168 to the conduit 169. I preferably utilize such fluid flow (which is in accordance with temperature variations) in order to actuate a mechanism which cannot conveniently be directly actuated by the thermostat itself. Such a mechanism is particularly shown in Figure 6. In this figure there is disclosed a housing 171 into one end of which an inlet pipe 172 is inserted and from one side of which an outlet pipe 173 extends. Between the inlet pipe 172 and the outlet pipe 173 there is a valve chamber 174 within which a valve 176 operates. In one of its extreme positions, the valve 176 is in abutment with a valve seat 177 interposed between the terminus of the pipe 172 and the chamber 174.

The valve 176 is extended and enlarged to provide a piston 178 which is translatable within a cylinder 179 preferably forming part of the housing 171. Normally, the piston 178 is urged into an extreme position with the valve 176 in abutment with the seat 177 so that there is no flow from the pipe 172 to the pipe 173 by means of a relatively heavy coiled spring 181 abutting the piston 178 and likewise abutting a cap 182 secured to the cylinder 179. The piston 178 is customarily made a relatively loose fit in the cylinder 179 so that there is some leakage in the cylinder from one side of the piston to the other.

In order that the valve 176 may control the flow from the pipe 172 to the pipe 173 in accordance with action of the thermostat, I preferably provide an extension 183 of the pipe 169 which opens into and affords communication with the interior of the cylinder 179 on the side of the piston opposed to the spring 181. As flow through the pipe 183 increases, it gradually overcomes the bias of the spring 181 and is sufficiently in excess of any leakage past the piston 178 so that the piston is translated against the bias of the spring 181 and the valve 176 is moved from its seat so that flow through the pipe 172 may proceed to the pipe 173. Leakage fluid passing around the piston escapes through a drain 184 which preferably leads to the atmosphere so that upon a decrease in flow through the duct 183 the spring 181 is again effective to translate the piston 178 into the position shown in Figure 6. The valve 176 is thus replaced on its seat 177 and flow from the pipe 172 to the pipe 173 is completely interrupted.

In place of a fluid mechanism for operating various units in accordance with the thermostat operation, it is likewise feasible, in accordance with my invention, to utilize electricity. In so doing, I preferably fashion a structure substantially as shown in Figure 7, in which the casing of the mechanism 191 is in all respects similar to the casing 151 or the casing 48 up to and including the abruptly flexing strip 192 held between suitable abutments 193 within the casing 191 and acted upon by a lever 196 under influence of a thermostat tube and rod, not shown. In the present instance, there is held in the casing 191 an insulating block 197 which carries a pair of stationary electrical contacts 198 and 199 respectively, which are included in a circuit comprising conductors 200 and 201.

In order that the circuit can be closed through contacts 198 and 199, I preferably provide a stem 203 which is translatable in the block 197 and is adapted to be acted upon by the strip 192 when the strip is flexed into one of its two extreme positions. In such position the stem 203 carries with it a spring contact 204 which is capable of bridging the contacts 198 and 199 and normally is held in abutment therewith by a spring 206 not only engaging the stem 203 but likewise abutting a plug 207 screwed into the casing 191.

As a form of safety or pilot thermostat, likewise useful in conjunction with an electric circuit, I preferably afford a mechanism substantially as shown in Figure 8, which shows a thermostat very similar to the one illustrated in Figures 3 and 4 and which in this instance, comprises a casing 212 providing a suitable mounting for a thermostat tube 213 and a thermostat rod 214. Forming a closure on the casing 212 is a cap 216 carrying an adjusting screw 217 which serves as the fulcrum of a lever 218 preferably constructed of somewhat resilient or springy material. A lever 218 is held in contact not only with the bolt 217 but likewise with the rod 214 by means of a coil spring 219 seated ina recess in the cover 216 and abutting the lever 218. At its lower end the lever 218 lies within the notched upper extremity of a lever 221 pivoted as at 223 between a pair of ears 225 projecting from the casing 217. Likewise carried on a pivot pin 224 passing between the ears 225 is a similar lever 226 which at its lower extremity provides a conductor adapted to contact with a spring clip 227 included in an electrical circuit by means of a suitable fastening device 228.

In order that movement of the lever 221 will be effective to produce an abrupt movement of the lever 226, I preferably interpose between the extremities of the two levers a coil spring 229 so that as the lever 218 moves the lever 221, the spring 229 will be effective abruptly to snap the lever 226 into and out of abutment with the contact 227.

I claim:

1. A thermostat comprising a casing, a tube mounted on said casing, a rod secured to said tube and extending into said casing, said tube and said rod moving relatively in response to changes in temperature, a lever fulcrumed in said casing, a collar on said rod bearing against said lever, a strip adapted to flex abruptly under influence of said lever from one extreme position to a second extreme position, a valve controlling flow through said casing, and means for affecting said valve in accordance with the flexure of said strip.

2. A thermostat comprising a casing, a tube mounted on and projecting from said casing, a rod within said tube and extending into said casing, means for securing said rod to the projecting end of said tube, said tube and said rod moving relatively in response to changes in temperature, a valve for controlling flow through said casing, and means for causing the relative motion between said rod and said tube to affect said valve abruptly including a longitudinally confined strip adapted to flex laterally and a lever encompassing said rod and adapted to actuate said strip.

3. A thermostat comprising a casing, a tube at one end mounted on said casing and at the other end projecting therefrom, a rod within said tube and extending into said casing, a threaded connection between the rod and said other end of said tube, said rod and said tube moving relatively in response to changes in temperature, a valve in said casing at one side of said rod, a lever encompassing said rod for transmitting relative longitudinal movement of said rod and said tube to said valve, and means for rotating said rod relative to said tube without affecting said valve.

4. A thermostat comprising a casing, a tube mounted on said casing, a rod within said tube, means for uniting adjacent ends of said rod and said tube for unitary longitudinal movement and for relative rotation, an imperforate valve in said casing, a lever passing around said rod for transmitting longitudinal movement of said tube to said valve, and means dependent upon rotation of said rod relative to said tube for varying the relationship between said tube and said valve.

5. A thermostat comprising a casing, a valve for controlling flow through said casing, a spring for urging said valve into seated position, a stem on said valve, a strip longitudinally confined in said casing, said strip being adapted to flex abruptly from one extreme position spaced from said stem to another extreme position against said stem and holding said valve in unseated position against the urgency of said spring, a lever fulcrumed in said casing and bearing on said strip, a tube mounted at one end on said casing and at the other end projecting therefrom, a rod at one end fastened to said other end of said tube and piercing said lever, a collar adjacent the other end of said rod and bearing upon said lever, and means for moving said rod relative to said tube for varying the relationship between said tube and said valve.

6. A thermostat comprising a mounting, a snap strip longitudinally confined in said mounting, a lever bearing on said mounting and said strip, said lever having an aperture therethrough, and a thermostat rod secured to said mounting and passing through said aperture to engage said lever.

7. A thermostat comprising a housing, a snap strip on said housing, a lever at one end engaging said snap strip and at the other end engaging said housing at a fulcrum point, and a thermostat rod passing through said housing between said snap strip and said fulcrum for actuating said lever.

8. A thermostat comprising a housing, a thermostat rod supported adjacent opposite ends in said housing, a projection between the ends of said rod, a snap strip in said housing, and a lever in said housing, one end of said lever being fulcrumed in said housing, the other end of said lever contacting said snap strip and an intermediate portion of said lever engaging said projection.

HORACE L. HIRSCHLER.